United States Patent [19]

Stout

[11] Patent Number: 4,498,023
[45] Date of Patent: Feb. 5, 1985

[54] VOICE COIL LINEAR MOTOR WITH INTEGRAL CAPACITOR

[75] Inventor: Roger P. Stout, Mesa, Ariz.

[73] Assignee: Motorola, Inc., Schaumburg, Ill.

[21] Appl. No.: 546,775

[22] Filed: Oct. 31, 1983

[51] Int. Cl.³ .............................................. H02K 41/00
[52] U.S. Cl. ........................................ 310/14; 310/15; 310/23; 310/27
[58] Field of Search .................... 310/12-15, 310/23, 27, 30, 34, 68 R; 318/135

[56] References Cited

U.S. PATENT DOCUMENTS

| | | | |
|---|---|---|---|
| 2,846,207 | 8/1958 | Marggraf | 310/27 X |
| 3,470,432 | 9/1969 | Chubbuck | 310/27 X |
| 3,487,241 | 12/1969 | Carter | 310/27 X |
| 3,577,023 | 5/1971 | Bleiman | 310/27 X |
| 3,676,758 | 7/1972 | Mathews | 310/27 X |
| 3,694,678 | 9/1972 | Scarrott | 310/13 |
| 3,783,311 | 1/1974 | Sato et al. | 310/27 |
| 3,965,377 | 6/1976 | Carbonneau | 310/14 |
| 3,984,706 | 10/1976 | Inouye | 310/12 |
| 4,305,105 | 12/1981 | Ho et al. | 360/106 |
| 4,427,906 | 1/1984 | Kainuma | 310/27 |

OTHER PUBLICATIONS

Rare Earth-Cobalt Magnets as applied to Linear Moving Coil Actuators, by Jack Kimble, Third International Workshop on Rare Earth-Cobalt Permanent Magnetics and Their Applications, Univ. of Calif., San Diego, Jun. 27-30, 1978, (Paper No. I-7).
Product Literature of General Scanning, Inc., Redondo Beach, CA, 1975 copyright.
Product Literature of KIMCO, Inc., San Marcos, CA, (no date).

Primary Examiner—Mark O. Budd
Attorney, Agent, or Firm—Paul F. Wille

[57] ABSTRACT

A voice coil linear motor is described in which the armature is supported on a linear bearing attached to the magnet assembly. The magnet assembly comprises a permanent magnet attached to two cup-shaped members which define a gap in which the armature travels. The armature comprises a coil, capacitive position sensing means, and a spindle for a chuck or other device.

12 Claims, 6 Drawing Figures

VOICE COIL LINEAR MOTOR WITH INTEGRAL CAPACITOR

BACKGROUND OF THE INVENTION

This invention relates to linear motors and, in particular, to what are known as voice coil linear motors due to the similarity to the voice coil mechanism in permanent magnet acoustic speakers.

In the prior art, voice coil motors or actuators have been used in a variety of applications, eg. magnetic head positioners in disc or tape drives, valve actuators, sonar transducers, vibration test equipment, and deflection mirrors for laser scanners. These applications typically require simply a short thrust of moderate force to accomplish the desired result.

In the manufacture of semiconductor devices, there is increasing emphasis on increasing the degree of automation and increasing the rate at which product is manufactured. Semiconductor devices are manufactured from silicon wafers, or other semiconductive material, approximately twenty mils (one half millimeter) thick, or less. Silicon is a brittle material and will crack if not handled carefully. The silicon wafer is diced or divided into chips or die which represent almost complete devices. The die must still be assembled into packages or carriers to obtain functional devices.

Because of the delicateness of silicon, or other semiconductive materials, the automatic handling of the die requires careful control of the forces applied to the die. One example of a manufacturing step where this occurs is in the die bond operation, where a die (the same word is used as either singular or plural) is removed from the wafer and placed on a header, eg. a metal member such as a lead frame, to which the die is soldered, brazed, or otherwise attached.

The desire for increased speed in manufacturing imposes the contradictory requirements of higher speed and not subjecting the die to excessive force. A voice coil motor can be cycled at the desired speed, if the moving parts are sufficiently light. However, merely designing a light bobbin does not necessarily solve the problem of not subjecting the die to excessive force.

Another problem in automated equipment is knowing where the moving parts are at any given time. Voice coil motors of the prior art simply rely on each end of the armature travel as estimates of position. In a dynamic, ie. moving, system handling delicate parts which must be exactly located, this is not good enough. Overshoot at either end and intermediate positions must be known as well. In this case, voice coil motors of the prior art may rely on an independent, external measuring device, such as a linear voltage differential transformer (LVDT) or linear potentiometer, to provide accurate positional information. Of necessity, this adds bulk and mass to the essential moving part of the motor, the bobbin, and increases the difficulty of aligning the various components during assembly.

In view of the foregoing, it is therefore an object of the present invention to provide a voice coil motor suitable for handling semiconductor die.

Another object of the present invention is to provide an improved voice coil motor in which the force applied by the motor is controlled.

A further object of the present invention is to provide a voice coil motor having an armature which can be located accurately.

Another object of the present invention is to provide an improved voice coil motor wherein the velocity of the armature can be controlled accurately.

A further object of the present invention is to provide an improved voice coil motor suitable for use in industrial or dirty ambients.

Another object of the present invention is to provide an improved voice coil motor having a linear bearing for rigidly supporting the armature.

SUMMARY OF THE INVENTION

The foregoing objects are achieved in the present invention wherein the voice coil motor comprises first and second nested, cup-shaped pole pieces separated by and connected to a permanent magnet and a cup-shaped armature having the coil wound thereon and comprising capacitive sensing means adjacent one end thereof. The armature fits between the pole pieces, thereby enclosing the inner pole piece. An arbor attached to the inner pole piece supports the armature and provides a linear bearing on which the armature rests. The outer pole piece comprises a disc shaped member impermanently attached to a cylindrical member, which facilitates cleaning the motor.

A more complete understanding of the present invention can be obtained by considering the following detailed description in conjunction with the accompanying drawings, in which.

Figure 1:
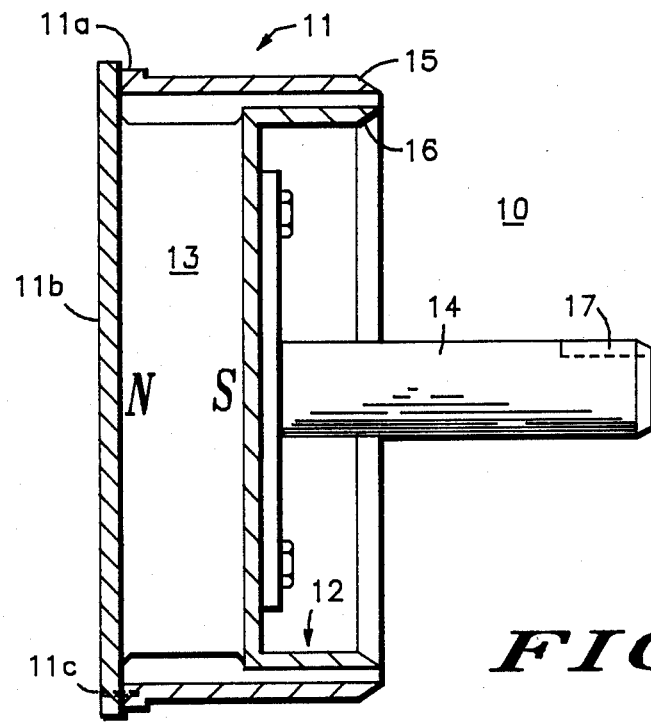
FIG. 1 illustrates a preferred embodiment of the pole pieces in accordance with the present invention.

FIG. 1 illustrates a preferred embodiment of a magnet assembly 10 in accordance with the present invention for use as an actuator in equipment for manufacturing semiconductor devices. Specifically, magnet assembly 10 comprises cup-shaped pole pieces 11 and 12 having permanent magnet 13 bonded therebetween. The inside diameter of pole piece 11 is greater than the outside diameter of pole piece 12 so that when the pole pieces are nested as shown, a gap is formed therebetween. Magnet 13 can be bonded to pole pieces 11 and 12 by any suitable means such as adhesive, eg. epoxy, or bolts. Of these two, an adhesive is preferred to obtain a permanent alignment of the pole pieces. Attached to pole piece 12 is arbor 14 which provides a linear bearing for the armature illustrated in FIG. 2. The outside edges of pole pieces 11 and 12, with respect to the gap, are provided with bevels 15 and 16, respectively, for controlling the fringe magnetic field at the end of the gap.

One application for voice coil motors in accordance with the present invention is in the assembly of semiconductor die into packages. This area of semiconductor assembly is not as clean as wafer processing areas. The result is that dust or dirt may find its way into the gap, between the armature and either pole piece. It is therefore necessary to provide some mechanism by which the motor can be disassembled and the gap cleaned without losing the alignment of the motor. In a preferred embodiment of the present invention, outer pole piece 11 comprises a cylindrical portion 11a and a disc-shaped portion 11b. These components are impermanently connected, eg. by way of dowels represented at 11c. Thus cylindrical portion 11a can be removed and the gap cleaned.

While arbor 14 is illustrated as extending along the axis of magnet assembly 10, thereby simplifying construction of the motor, it is understood that one or more arbors could be provided in accordance with the present invention, as long as they are parallel to the axis of the motor. While arbors are normally considered as a support mechanism on which some other member rotates, in the present invention arbor 14 provides a linear bearing for movement along the axis of the motor, not rotation about the axis. Rotation about the axis can be prevented by any suitable means, eg. a key 17 for receiving a Woodruff key connecting arbor 14 with the bearing surface in the armature. Alternatively, arbor 14 can be provided with a non-circular cross-sectional shape, thereby preventing rotation about the axis of the motor.

In some voice coil motors of the prior art, means are provided to support the armature within the gap of the magnet assembly. These devices, such as a speaker cone and a voice coil web, provide a restoring force to the armature. This is undesirable since it causes non-linearities in the operation of the motor. In accordance with the present invention, the armature is freely moveable along the axis on arbor 14 and is totally controlled by the current through the coil in the armature. This greatly simplifies the control circuitry used with a motor in accordance with the present invention, since the force applied by the motor is simply proportional to the current through the coil. This current is readily monitored by simply inserting a resistor of known value in series with the coil. The voltage drop across this series resistor is applied to suitable operational amplifier circuitry to provide a signal representing both the force applied by the motor and a signal representing the acceleration of the motor.

Figure 2:
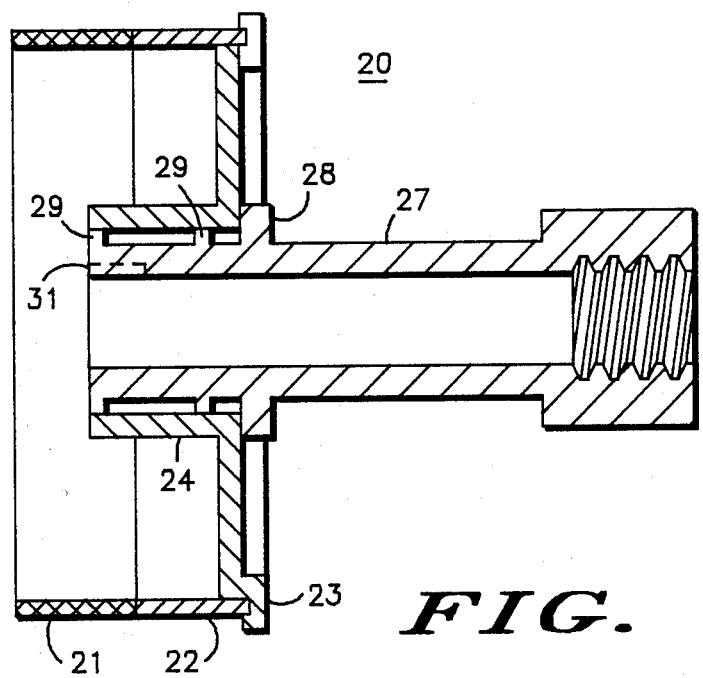
FIG. 2 illustrates a preferred embodiment of an armature in accordance with the present invention.

FIG. 2 illustrates a preferred embodiment of an armature in accordance with the present invention. Armature 20 comprises coil 21 connected at one end to feedback capacitor 22 which is connected at its end to bobbin 23. Bobbin 23 comprises a sleeve portion 24 which can serve as a bearing for arbor 14 or as a fitting for receiving a suitable mechanical linking mechanism such as spindle 27. Spindle 27 comprises a shoulder portion 28 for engaging bobbin 23, thereby axially locating spindle 27 with respect to bobbin 23.

As illustrated in FIG. 2, spindle 27 preferably comprises a reduced diameter portion having annular ridges 29 for engaging the inner surface of sleeve 24. This facilitates the insertion of spindle 27 into bobbin 23. Alternatively, one could make the portion of spindle 27 engaging sleeve 24 the same outside diameter as the inside diameter of sleeve 24. The inside diameter of spindle 27 is approximately equal to the outside diameter of arbor 14 thereby providing a close engagement to arbor 14 but not so tight a fit as to prevent spindle 27 from freely sliding on arbor 14. If arbor 14 and the bore within spindle 27 are round, a suitable cut out 31 can be provided for a key mechanism to prevent the rotation of spindle 27 about arbor 14. The large bearing surface obtained from arbor 14 and spindle 27 assures good radial alignment.

In a preferred embodiment of the present invention, which is intended for high speed actuation, spindle 27 preferably comprises aluminum, bobbin 23 preferably comprises a rigid plastic or phenolic material, capacitor 22 comprises anodized aluminum, and coil 21 comprises insulated copper wire. Arbor 14 also comprises aluminum. Thus constructed, armature 20 is capable of cycling from one end position to the other and back again at a rate of fifty times per second, greatly in excess of what is needed at present in the assembly of semiconductor devices.

Figure 3:
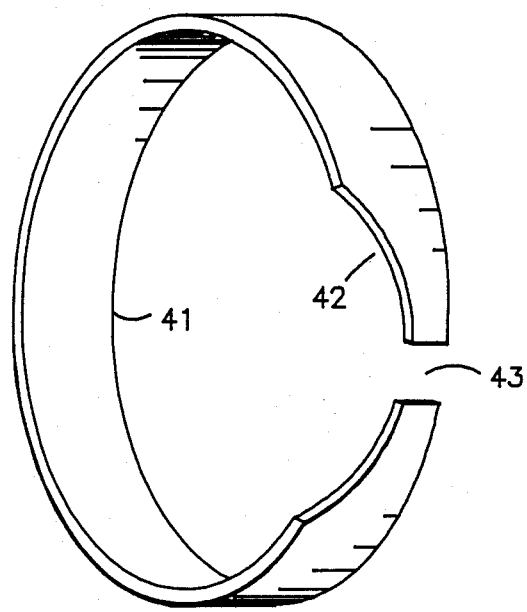
FIG. 3 illustrates a preferred embodiment of the capacitor plate of the position sensing means.

FIG. 3 illustrates a preferred form of capacitive sense means in accordance with the present invention. Specifically, the sense means comprises a cylindrical, metallic member 41 having a predetermined width or height in a direction parallel to the axis of the motor. When the motor is assembled such that armature 20 rides on arbor 14, coil 21 is located within the gap between pole pieces 11 and 12 and member 41 is located adjacent the open end of the magnetic gap. Member 41 is a moveable plate of a capacitor in which either or both of pole pieces 11 and 12 act as fixed plates. As armature 20 is extended from magnet assembly 10, the overlap between pole pieces 11 and 12 and member 41 changes, thereby changing the capacitance exhibited therebetween. This change in capacitance can be sensed by any suitable means, well known per se in the art. For example, the variation in capacitance can be sensed as a frequency or phase shift in an applied alternating current signal.

There are two problems with this configuration, both of which are solved by a sensor in accordance with the present invention. A first is that the variation in capacitance is a non-linear function of the displacement of the armature. To correct for this, cut-out 42 is formed in member 41, changing the height of sensor 41 over a predetermined portion thereof. The particular shape of the arc formed in member 41 can readily be determined analytically or emperically, and depends upon the shape of the fixed plates and the fringe field associated therewith and the particular detection method employed. For example, the shape is different for phase shift and frequency modulation. In a preferred embodiment of the present invention a circular arc approximating a secant squared function has been found suitable for phase shift measurement.

Member 41 is further provided with a gap 43 in the circumference thereof. Gap 43 can be located anywhere in the circumference of member 41 and is conveniently formed at the height of arc 42. Gap 43 is provided to prevent member 41 from acting as a single turn coil, i.e. gap 43 prevents mutual inductive coupling between the coil of the motor and member 41 which would otherwise cause a measurable loss of energy from the coil during transient applications of current. This represents somewhat of a trade-off against reduced time constant. In some applications, gap 43 may be eliminated to obtain maximum bandwidth, ie. the shorted turn reduces the electrical time constant. The motor will dissipate more power than when gap 43 is provided.

Member 41 may comprise any suitable material and in one embodiment of the present invention comprises an anodized aluminum. The aluminum is anodized to electrically insulate member 41 from the pole pieces.

A voice coil motor constructed in accordance with the present invention comprised a magnetic assembly having a gap 22 millimeters in diameter, 9.9 millimeters in length, and 0.99 millimeters wide. The capacitor exhibited a capacitance of 20 picofarads when the armature was fully extended and a capacitance of 60 picofarads when the armature is fully retracted. The mass of the motor was 40 grams of which the mass of the armature, i.e. the coil, capacitor, bobbin, and spindle, was 4.2 grams. In a closed loop circuit, i.e. an electrical circuit in which force, acceleration, and position information are fed back to the coil driver, the motor constructed in accordance with the present invention exhibited position control having a linearity of plus or minus 0.7%, a repeatability of plus or minus 0.3% and a response time of 6 milliseconds to positional step requests. The velocity control was characterized by a response time of 0.5 milliseconds to triangular wave requests in a speed range of 0–30 inches per second. Fully controlled stop-to-stop movement under velocity control was less than 10 milliseconds. The force control was characterized by a range of 0–150 grams and a response time of 0.5 milliseconds.

Figure 4:
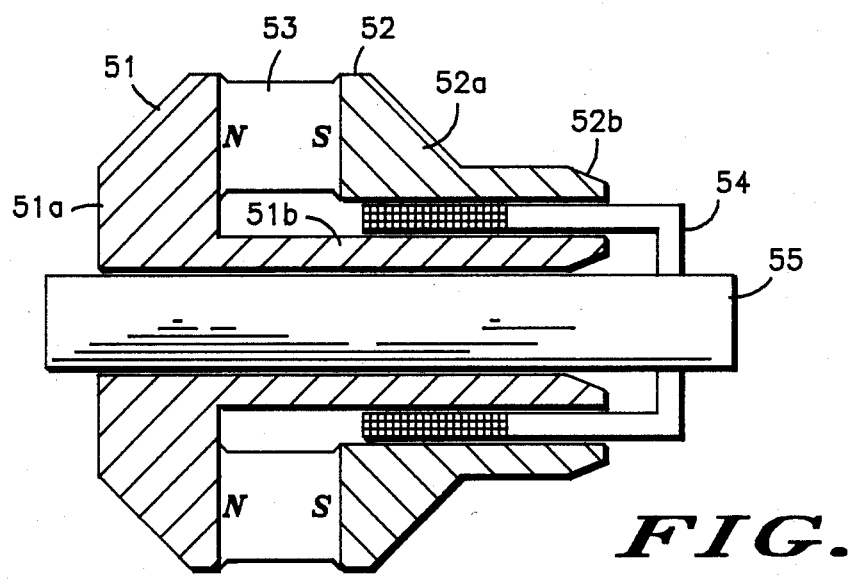
FIG. 4 illustrates an alternative embodiment of the present invention.

FIG. 4 illustrates an alternative embodiment of the present invention in which the voice coil motor is made more powerful yet is no larger than the embodiment of FIGS. 1 and 2. Specifically, voice coil motor 50 comprises first and second pole pieces 51 and 52 having annular magnet 53 positioned therebetween. Pole piece 51 comprises a disc shaped portion 51a and a cylindrical portion 51b. The cylindrical portion has a smaller outside diameter than the outside diameter of disc portion 51a. Similarly, pole piece 52 has a disc shaped portion 52a and a cylindrical shaped portion 52b, wherein cylindrical portion 52b has a larger inside diameter than the outside diameter of cylindrical portion 51b, thereby defining a gap therebetween. The disc shaped portions of pole pieces 51 and 52 are joined to magnet 53 by any suitable means such as adhesive, not shown.

Voice coil motor 50 further comprises armature 54 positioned within the gap between pole pieces 51 and 52. Attached to armature 54 is arbor 55 which fits within pole piece 51, which serves as the bearing for arbor 55. In a sense, voice coil motor 50 is the inverse of the voice coil motor illustrated in FIGS. 1 and 2 in that the longer cylindrical member of the magnet structure has the smaller diameter and the shorter cylindrical member of the magnet structure has the larger diameter. The result of the change in the magnet structure puts the gap at a smaller diameter relative to the magnet size, thereby enabling the voice coil motor to produce a greater force.

Figure 5:
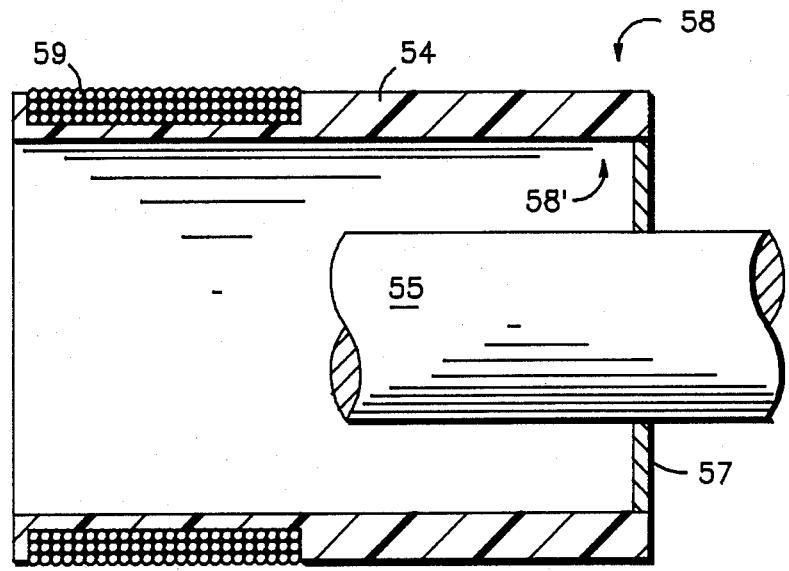
FIG. 5 illustrates an alternative embodiment of the capacitive sensor in accordance with the present invention.

FIG. 5 illustrates an alternative embodiment of a bobbin in accordance with the present invention in which a cylinder of insulating material has the capacitive transducer plated thereon. Specifically, cylindrical member 57, which may for example comprise a phenolic resin material, is plated with aluminum on the inner and outer portions thereof to form capacitive plates 58 and 58'. The plating may be either done selectively so that only one end of cylindrical member 57 is plated or the entire cylindrical member can be plated and a portion thereof removed. Coil 59 is wound on the other end of member 57, preferably in a groove formed in member 57, thereby maintaining a uniform outside diameter over the length of the cylindrical member. This enables a thinner gap to be used, increasing the efficiency of the voice coil motor. Arbor 55 is connected to cylindrical member 54 by way of disc 57. Arbor 55 and disc 57 may comprise a single piece machined from larger diameter stock or can comprise separate pieces which are press-fit or otherwise suitably connected. Disc 57 is connected to cylindrical member 54 by way of an adhesive, such as epoxy.

Figure 6:
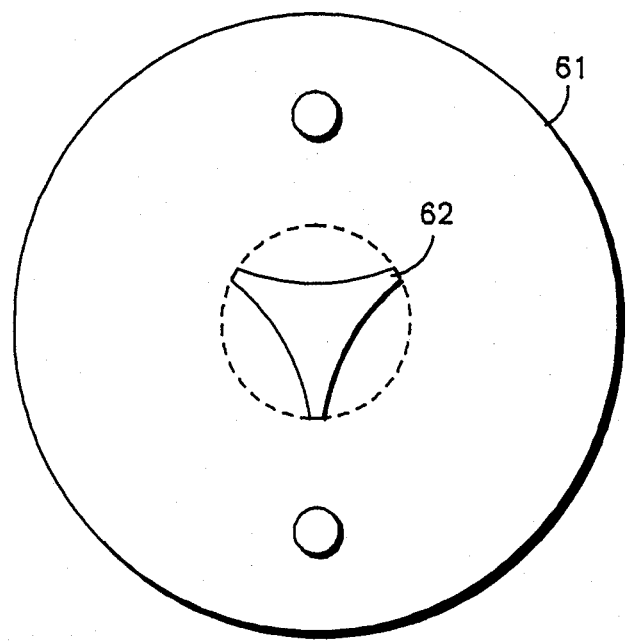
FIG. 6 illustrates an alternative embodiment of a linear bearing in accordance with the present invention.

FIG. 6 illustrates an alternative embodiment of arbor 14 as illustrated in FIG. 1 wherein the arbor does not contact spindle 27 about the entire surface thereof. Specifically, arbor 62 is attached to plate 61 for connection to the magnet structure such as illustrated in FIG. 1. Arbor 62 comprises a fluted shaft which contacts spindle 27 only at the places where it is of full diameter. The fluted structure for arbor 62 achieves two advantages, the contact area of the bearing is reduced, thereby reducing friction, and the flutes provide a volume in which dirt can accumulate rather than becoming jammed between the full diameter portions of arbor 62 and spindle 27.

There is thus provided by the present invention an improved voice coil motor which is capable of handling semiconductor die at high speed yet under carefully controlled conditions. The force applied by the armature and the location of the armature can be accurately controlled. Further, the design of the voice coil motor in accordance with the present invention simplifies the design of suitable control circuitry by requiring only linear feedback.

Having thus described the invention it will be apparent to those of skill in the art that various modifications can be made within the spirit and scope of the present invention. For example, while a cylindrical magnet assembly and armature were chosen to provide a lightweight yet rigid motor, non-cylindrical configurations, eg. a segmented magnet, can be used within the spirit and scope of the present invention. While the coil is preferably wound on a mandrel and connected to the capacitive sensor only by the edge thereof to obtain the lightest weight possible, it is understood that larger motors, generating greater force, may require that the coil and capacitive sensor each be attached to a suitable sleeve to increase the bonding therebetween.

I claim:

1. A voice coil motor having fixed pole pieces and a moveable armature wherein said armature comprises:
    a cylindrical, electrically conductive member of varying height located adjacent at least one of said pole pieces, said member and at least one of said pole pieces forming a capacitor.

2. The motor of claim 1 wherein said member is located adjacent an end of said pole piece and the capacitance of said capacitor varies as said armature is moved relative to said pole pieces.

3. The motor of claim 2 wherein said capacitance varies with the displacement of said armature.

4. A voice coil motor comprising:
    magnetic pole piece means having first and second nested, cup-shaped members with magnetic means interposed and attached thereto;
    wherein the inner diameter of the first cup-shaped member is greater than the outer diameter of the second cup-shaped member, thereby providing a gap;
    arbor means extending from said pole piece means along the axis thereof, for providing a linear bearing; and
    armature means, slideably engaging said arbor means, having bobbin means freely moveable within said gap.

5. The motor as set forth in claim 4 wherein said first cup-shaped member comprises:

a cylindrical portion and a disc shaped portion impermanently attached thereto whereby said motor can be disassembled to clean said gap.

6. The motor as set forth in claim 4 wherein said armature further comprises:
a capacitor plate connected to said bobbin and located at least partially within said gap, said plate and at least one of said cup-shaped members forming a capacitor characterized by a change in capacitance as said armature moves along said arbor.

7. The motor as set forth in claim 6 wherein said capacitor plate has a portion thereof removed for providing a predetermined change in capacitance as said armature is displaced.

8. A voice coil motor comprising:
magnetic pole piece means including a first pole piece having a cylindrical portion and a disc-shaped portion and a second pole piece having a cylindrical portion and a disc-shaped portion;
wherein the diameter of the cylindrical portion of the first pole piece is less than that of the second pole piece and the length of the cylindrical portion of the first pole piece is greater than that of the second pole piece, said cylindrical portion of said first pole piece acting as a bearing surface for said arbor;
armature means having bobbin means freely moveable within said gap; and
arbor means extending from said bobbin means slideably engaging said cylindrical portion of said first pole piece for providing a linear bearing.

9. The motor as set forth in claim 8 wherein said armature further comprises:
capacitive transducer means having a first plate connected to said bobbin and located adjacent said gap, said transducer means characterized by a change in capacitance as said armature moves along said arbor.

10. The motor as set forth in claim 9 wherein said transducer means includes said capacitor plate having a portion thereof removed for providing a predetermined change in capacitance as said armature is displaced.

11. The voice coil motor as set forth in claim 4 or 8 wherein said arbor is fluted.

12. The voice coil motor as set forth in claim 10 wherein a second plate of said transducer means comprises at least one of said first and second pole pieces.

* * * * *